(12) United States Patent
Vangelov et al.

(10) Patent No.: US 10,140,110 B2
(45) Date of Patent: Nov. 27, 2018

(54) MULTIPLE CHUNK SOFTWARE UPDATES

(71) Applicant: Ford Global Technologies, LLC, Dearborn, MI (US)

(72) Inventors: John Vangelov, South Lyon, MI (US); Brian Petersen, Beverly Hills, MI (US); Ritesh Pandya, Rochester Hills, MI (US); Praveen Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 674 days.

(21) Appl. No.: 14/243,005

(22) Filed: Apr. 2, 2014

(65) Prior Publication Data

US 2015/0286475 A1 Oct. 8, 2015

(51) Int. Cl.
G06F 9/445 (2018.01)
G06F 8/65 (2018.01)
G06F 8/71 (2018.01)

(52) U.S. Cl.
CPC . *G06F 8/65* (2013.01); *G06F 8/71* (2013.01)

(58) Field of Classification Search
CPC ........... G06F 9/44505; G06F 8/65; G06F 8/71
See application file for complete search history.

(56) References Cited

U.S. PATENT DOCUMENTS

| | | | |
|---|---|---|---|
| 4,847,830 A * | 7/1989 | Momirov | G06F 8/65 370/400 |
| 5,155,847 A | 10/1992 | Kirouac et al. | |
| 6,035,423 A | 3/2000 | Hodges et al. | |
| 6,177,957 B1 * | 1/2001 | Anderson | G06F 8/65 348/231.99 |
| 6,263,360 B1 | 7/2001 | Arnold et al. | |
| 6,359,570 B1 | 3/2002 | Adcox et al. | |
| 6,536,037 B1 * | 3/2003 | Guheen | G06F 8/71 703/2 |
| 6,694,248 B2 | 2/2004 | Smith et al. | |
| 6,704,564 B1 | 3/2004 | Lange et al. | |
| 6,853,910 B1 | 2/2005 | Oesterling et al. | |
| 7,055,149 B2 | 5/2006 | Birkholz et al. | |
| 7,092,803 B2 | 8/2006 | Kapolka et al. | |
| 7,155,321 B2 | 12/2006 | Bromley et al. | |

(Continued)

OTHER PUBLICATIONS

A Model for Safe and Secure Execution of Downloaded Vehicle Applications, Phu H. Phung—Dept. of Computer Science and Engineering, Chalmers University of Technology, Sweden; Dennis Kengo Nilsson, Syncron, Japan; Road Transport Information and Control Conference and the ITS United Kingdom Members' Conference, May 25-27, 2010.

(Continued)

*Primary Examiner* — Ziaul A Chowdhury
(74) *Attorney, Agent, or Firm* — Jennifer M. Stec; Brooks Kushman P.C.

(57) ABSTRACT

A system may include a vehicle-based computing system. The vehicle-based computing system may identify from a first software update chunk retrieved from a subscribed topic for receiving vehicle updates, a number of chunks of the update, retrieve additional chunks of the update by subscription to each of a sequence of subtopics to the subscribed topic, each subtopic associated with a respective remaining one of the number of chunks, and update the software utilizing the retrieved chunks.

20 Claims, 7 Drawing Sheets

(56) References Cited

U.S. PATENT DOCUMENTS

| | | | |
|---|---|---|---|
| 7,171,661 B1 | 1/2007 | Pinera et al. | |
| 7,209,859 B2 | 4/2007 | Zeif | |
| 7,366,589 B2 | 4/2008 | Habermas | |
| 7,506,309 B2 | 3/2009 | Schaefer | |
| 7,512,941 B2 | 3/2009 | Pan et al. | |
| 7,672,756 B2 | 3/2010 | Breed | |
| 7,822,775 B2 | 10/2010 | Langer | |
| 7,886,180 B2 | 2/2011 | Jin et al. | |
| 7,904,569 B1 | 3/2011 | Gelvin et al. | |
| 7,937,075 B2 | 5/2011 | Zellner | |
| 8,326,486 B2 | 12/2012 | Moinzadeh et al. | |
| 8,370,254 B1 | 2/2013 | Hopkins, III et al. | |
| 8,416,067 B2 | 4/2013 | Davidson et al. | |
| 8,427,979 B1 | 4/2013 | Wang | |
| 8,452,465 B1 | 5/2013 | Sinha et al. | |
| 8,458,315 B2 | 6/2013 | Miche et al. | |
| 8,473,938 B1* | 6/2013 | Feeser | G06F 8/65 717/168 |
| 8,494,449 B2 | 7/2013 | Witkowski et al. | |
| 8,498,771 B2 | 7/2013 | Dwan et al. | |
| 8,521,424 B2 | 8/2013 | Schunder et al. | |
| 8,561,054 B2 | 10/2013 | Smirnov et al. | |
| 8,918,231 B2 | 12/2014 | Rovik | |
| 9,075,686 B2 | 7/2015 | Alrabady et al. | |
| 9,201,844 B2 | 12/2015 | Guenkova-Luy et al. | |
| 9,323,546 B2* | 4/2016 | Rork | G06F 8/65 |
| 9,626,175 B2* | 4/2017 | Davey | G06F 8/65 |
| 2002/0120394 A1 | 8/2002 | Rayne | |
| 2002/0150050 A1 | 10/2002 | Nathanson | |
| 2002/0165962 A1 | 11/2002 | Alvarez et al. | |
| 2003/0037030 A1* | 2/2003 | Dutta | G06F 8/71 |
| 2004/0010358 A1 | 1/2004 | Oesterling et al. | |
| 2004/0034624 A1 | 2/2004 | Deh-Lee et al. | |
| 2004/0064385 A1 | 4/2004 | Tamaki | |
| 2004/0117851 A1 | 6/2004 | Karaoguz et al. | |
| 2004/0168169 A1 | 8/2004 | Ebro et al. | |
| 2004/0250060 A1 | 12/2004 | Diep et al. | |
| 2005/0010458 A1 | 1/2005 | Holloway et al. | |
| 2005/0055687 A1 | 3/2005 | Mayer | |
| 2005/0090941 A1 | 4/2005 | Stefan et al. | |
| 2005/0125261 A1 | 6/2005 | Adegan | |
| 2005/0144616 A1 | 6/2005 | Hammond et al. | |
| 2005/0149922 A1 | 7/2005 | Vincent | |
| 2005/0165760 A1* | 7/2005 | Seo | G06F 8/71 |
| 2005/0187668 A1 | 8/2005 | Baumgarte | |
| 2005/0187682 A1 | 8/2005 | Gault et al. | |
| 2005/0203673 A1 | 9/2005 | El-Hajj et al. | |
| 2005/0216902 A1 | 9/2005 | Schaefer | |
| 2005/0256614 A1* | 11/2005 | Habermas | G06F 8/65 701/1 |
| 2005/0262499 A1 | 11/2005 | Read | |
| 2006/0047381 A1 | 3/2006 | Nguyen | |
| 2006/0047415 A1 | 3/2006 | Groskreutz et al. | |
| 2006/0047666 A1 | 3/2006 | Bedi et al. | |
| 2006/0075397 A1* | 4/2006 | Kasahara | G06F 8/65 717/170 |
| 2006/0141997 A1 | 6/2006 | Amiens | |
| 2006/0142913 A1 | 6/2006 | Coffee | |
| 2006/0155439 A1 | 7/2006 | Slawinski et al. | |
| 2006/0258377 A1 | 11/2006 | Economos et al. | |
| 2007/0055414 A1* | 3/2007 | Darji | G07C 5/0841 701/2 |
| 2008/0082548 A1 | 4/2008 | Betts | |
| 2008/0102854 A1 | 5/2008 | Yi et al. | |
| 2008/0133337 A1 | 6/2008 | Fletcher et al. | |
| 2008/0140278 A1 | 6/2008 | Breed | |
| 2008/0208972 A1 | 8/2008 | Chou et al. | |
| 2008/0301670 A1 | 12/2008 | Gouge et al. | |
| 2009/0064123 A1 | 3/2009 | Ramesh et al. | |
| 2009/0088141 A1 | 4/2009 | Suurmeyer et al. | |
| 2009/0088924 A1 | 4/2009 | Coffee | |
| 2009/0119657 A1* | 5/2009 | Link, II | G06F 8/65 717/171 |
| 2009/0125897 A1* | 5/2009 | Matlin | G06F 8/65 717/168 |
| 2009/0138516 A1* | 5/2009 | Young | G06F 8/61 |
| 2009/0182825 A1 | 7/2009 | Fletcher | |
| 2010/0082559 A1 | 4/2010 | Sumcad et al. | |
| 2010/0228404 A1 | 9/2010 | Link, II et al. | |
| 2010/0235433 A1 | 9/2010 | Ansari et al. | |
| 2010/0241722 A1 | 9/2010 | Seminaro et al. | |
| 2011/0045842 A1 | 2/2011 | Rork et al. | |
| 2011/0083128 A1 | 4/2011 | Hoch et al. | |
| 2011/0099232 A1 | 4/2011 | Gupta et al. | |
| 2011/0105029 A1 | 5/2011 | Takayashiki et al. | |
| 2011/0106375 A1 | 5/2011 | Gurusamy Sundaram | |
| 2011/0112969 A1 | 5/2011 | Zaid et al. | |
| 2011/0137490 A1 | 6/2011 | Bosch et al. | |
| 2011/0258268 A1 | 10/2011 | Banks et al. | |
| 2011/0306329 A1 | 12/2011 | Das | |
| 2011/0307933 A1 | 12/2011 | Gavita et al. | |
| 2012/0079149 A1 | 3/2012 | Gelvin et al. | |
| 2012/0094643 A1 | 4/2012 | Brisebois et al. | |
| 2012/0142367 A1 | 6/2012 | Przybylski | |
| 2012/0245786 A1 | 9/2012 | Fedorchuk et al. | |
| 2012/0253861 A1 | 10/2012 | Davidson | |
| 2012/0330723 A1 | 12/2012 | Hedy | |
| 2013/0031540 A1* | 1/2013 | Throop | G06F 8/654 717/173 |
| 2013/0042231 A1* | 2/2013 | Davey | G06F 8/65 717/174 |
| 2013/0130665 A1 | 5/2013 | Peirce et al. | |
| 2013/0204455 A1 | 8/2013 | Chia et al. | |
| 2013/0204466 A1 | 8/2013 | Ricci | |
| 2013/0226393 A1 | 8/2013 | Julson et al. | |
| 2014/0066047 A1 | 3/2014 | Qiang | |
| 2014/0100737 A1 | 4/2014 | Haap et al. | |
| 2014/0222282 A1* | 8/2014 | Pauli | G06F 21/31 701/32.6 |
| 2014/0282467 A1 | 9/2014 | Mueller | |
| 2014/0282470 A1* | 9/2014 | Buga | G06F 8/65 717/170 |
| 2014/0324275 A1 | 10/2014 | Stanek et al. | |
| 2014/0380296 A1* | 12/2014 | Pal | G06F 8/65 717/171 |
| 2015/0003456 A1 | 1/2015 | Seo et al. | |
| 2015/0046080 A1 | 2/2015 | Wesselius et al. | |
| 2015/0058946 A1 | 2/2015 | Salamon et al. | |
| 2015/0128123 A1* | 5/2015 | Eling | G06F 8/67 717/171 |
| 2015/0169311 A1 | 6/2015 | Dickerson et al. | |
| 2015/0169319 A1* | 6/2015 | Ahmed | G06F 8/71 717/122 |
| 2015/0281374 A1* | 10/2015 | Petersen | H04L 67/12 709/223 |
| 2015/0309784 A1 | 10/2015 | Molin | |

OTHER PUBLICATIONS

Vehicle Telematics: A Literature Review, Ian Cassias, Andrew L. Kun, Technical Report ECE.P54.2007.9, Oct. 30, 2007.

* cited by examiner

MULTIPLE CHUNK SOFTWARE UPDATES

TECHNICAL FIELD

The illustrative embodiments generally relate to a method and apparatus for performing multi-part software updates, targeted to a specific vehicle or vehicles having a particular configuration.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

SUMMARY

In a first illustrative embodiment, a system includes a vehicle-based computing system configured to identify, from a first software update chunk retrieved from a subscribed topic for receiving vehicle updates, a number of chunks of the update, retrieve additional chunks of the update by subscription to each of a sequence of subtopics to the subscribed topic, each subtopic associated with a respective remaining one of the number of chunks, and update the software utilizing the retrieved chunks.

In a second illustrative embodiment, a method comprising identifying by a computing system of a vehicle, from a retrieved first software update chunk retrieved from a subscribed topic for receiving vehicle updates, a number of chunks of the update; retrieving additional chunks of the update by subscription to each of a sequence of subtopics to the subscribed topic, each subtopic associated with a respective remaining one of the number of chunks; and updating the software utilizing the retrieved chunks.

In a third illustrative embodiment, a non-transitory computer-readable medium including instructions that when executed by a computing system of a vehicle cause the vehicle to identify, from a first software update chunk retrieved from a subscribed topic for receiving vehicle updates, a number of chunks of the update retrieve additional chunks of the update by subscription to each of a sequence of subtopics to the subscribed topic, each subtopic associated with a respective remaining one of the number of chunks; and update the software utilizing the retrieved chunks.

DETAILED DESCRIPTION

Figure 1:
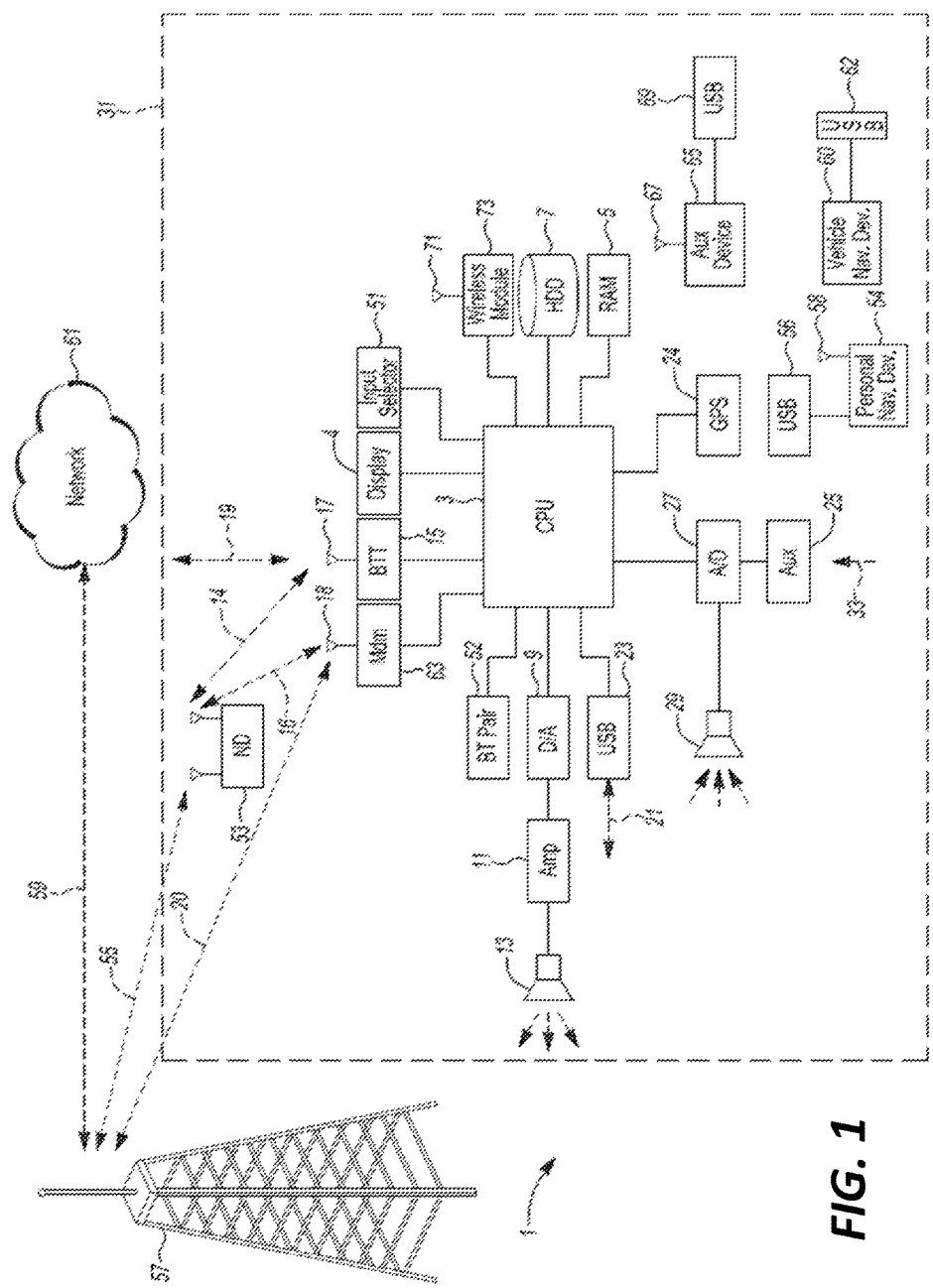
FIG. 1 illustrates an example block topology for a vehicle-based computing system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle software update system may utilize a publish/subscribe model to publish software updates that can be consumed by vehicle subscribers. The publish/subscribe model may utilize topics, also known as logical channels, through which publishers may send messages and subscribers may receive messages. In some cases, a vehicle may be a publisher and may send vehicle alerts to a service delivery network, respond to commands from the service delivery network, or notify the service delivery network of vehicle connectivity status. In other cases, a vehicle may be a subscriber and may receive control messages or software updates from a service delivery network.

A topic tree structure may be utilized by the vehicle software update system to define a structure of the topics and sub-topics that are used in sending messages between the vehicles and the service delivery network. A vehicle-based computing system (VCS), such as a telematics unit of a vehicle, may subscribe to nodes of the topic tree that correspond to the installed software/firmware version of one or more modules included within vehicle. These modules may include, as one example, a telematics unit (TCU).

A publisher of software updates (e.g., without limitation, a remote original equipment manufacturer (OEM) server, etc.) may provide a notification message in a topic node corresponding to a vehicle to be updated or a version of the software to be updated. The publisher may further publish a software upgrade in a topic node associated with a version of the software to be updated by the software upgrade. In some examples, the notification message may include, take the form of, or include a network download location of a global configuration file specifying a desired software version for which the global configuration file is applicable. The vehicle may retrieve the message and determine whether to upgrade its software version to the desired version specified by the notification. For example, if the desired software version is newer than the installed software version of the vehicle, the vehicle may target to update to the desired software version. To perform the update, the vehicle may subscribe to the topic node corresponding to its installed software version, and install the software update published to that topic node. Thus, to update VCSs of a particular software version, a publisher of software updates may provide a software update, and publish a configuration file in a topic of the particular software version to be updated.

However, in some cases the size of a software update may exceed the amount of memory available in a download area of the recipient module or device. In an example, a software update may involve downloading a one megabyte file for installation on a module; however, the area available for processing that download may be unable to manage downloaded elements beyond 128 kilobytes in size. If the transport for delivering the file is unable to break the file into multiple sub-sections (referred to herein as chunks), then the module may be unable to perform the download and installation of the software update.

To utilize the area available for processing software updates, software update files may be split into multiple chunks, where each chunk may be of a size that is manageable by the receiving module. To facilitate their download, each chunk of the software update may further be associated with a unique sequenced topic of the topic tree. The receiving module may identify that the software update includes multiple chunks, and may further subscribe to the multiple topic nodes corresponding to each of the chunks of the software update. For each chunk, the receiving module may retrieve and process the chunk. When complete, the accumulation of chunks may be equivalent to receiving and processing the original contiguous file of the software update. Accordingly, by utilizing the chunk update mechanism, software updates of arbitrary size may be handled by a receiving module having only a fixed maximum amount of resources to receive and process software updates.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
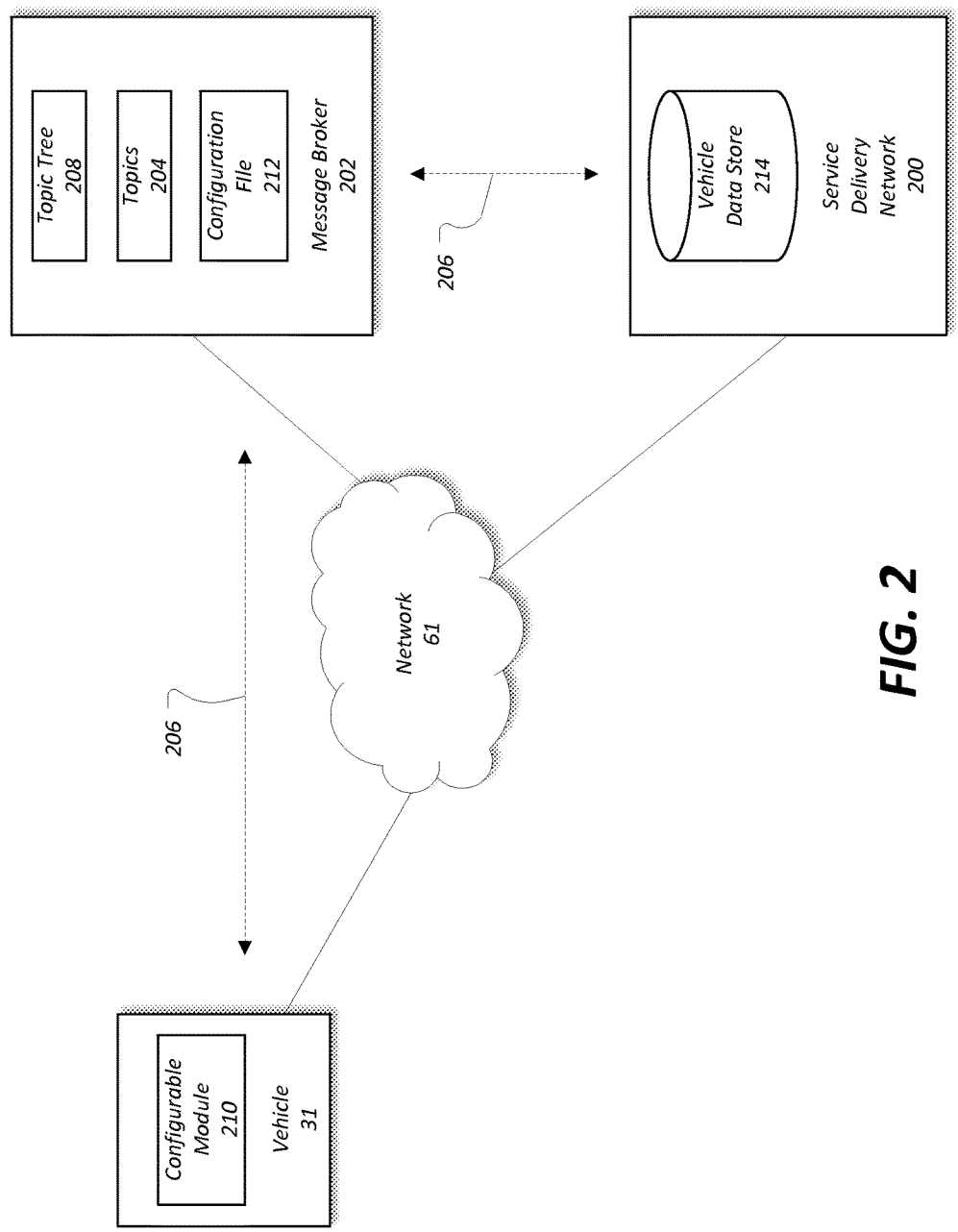
FIG. 2 illustrates an exemplary service delivery network in communication over the network with a vehicle having a configurable module.

FIG. 2 illustrates an exemplary service delivery network 200 in communication over the network 61 with a vehicle 31 having a configurable module 210 by way of a message broker 202. The vehicle 31 may be in wireless communication with the network 61 by way of the VCS 1 of the vehicle 31. When a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31. Using the queried information and additional information identifying the specific vehicle 31 (e.g., vehicle identification number (VIN) information published on the car area network (CAN) bus, subscriber identity module (SIM) information of the modem 63 such as international mobile station equipment identity (IMEI), etc.), the VCS 1 may communicate via the network 61 and message broker 202 to establish an account with the service delivery network 200. The service delivery network 200 may receive these communications from the vehicles 31, and may maintain a data store of the hardware configurations and software (e.g., firmware, etc.) versions linked to identifiers of the vehicles 31.

The message broker 202 may additionally provide publish/subscribe messaging functionality for communication between the service delivery network 200 and the vehicles 31. The publish/subscribe model may utilize one or more topics 204, where topics 204 are named logical channels through which publishers may send messages 206 and subscribers may receive messages 206. Rather than receiving all the messages 206, subscribers to the topics 204 receive the messages 206 published to the topics 204 to which they subscribe, and all subscribers to a topic 204 will receive substantially the same topic messages 206.

Figure 3A:
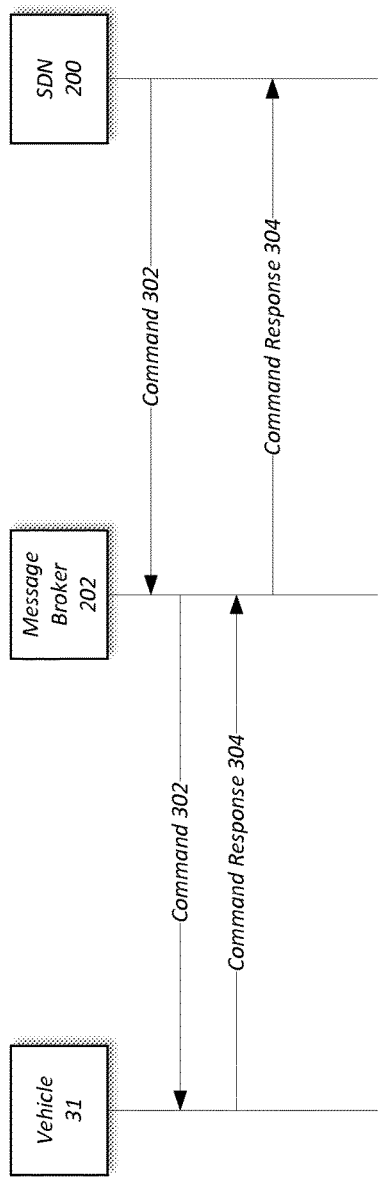
FIGS. 3A and 3B illustrate exemplary communications flows of messages between the vehicle and the service delivery network via the message broker.
Figure 3B:
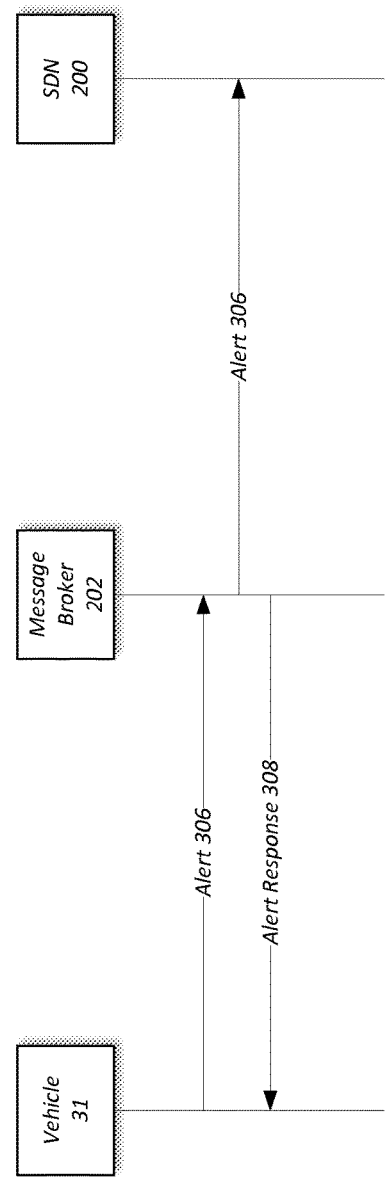

FIGS. 3A and 3B illustrate exemplary communications flows of messages 206 between the vehicle 31 and the service delivery network 200 via the message broker 202. Messages 206 may be of various categories, such as commands 302, command responses 304, and alerts 306.

As shown in FIG. 3A, a command 302 may be published by the service delivery network 200 to a topic of the message broker 202 that is subscribed to by vehicle 31. A command 302 is a type of message 206 that requests a recipient of the command 302 to perform an action specified by the command 302. A command response 304 is a message 206 provided back to a sender responsive to receipt of a command 302. The response 304 to the command 302 may be published by the vehicle 31 to a topic 204 subscribed to by the service delivery network 200. One example command 302 may be a software update command 302 published to a topic 204 subscribed to by the vehicles 31 to be updated.

As shown in FIG. 3B, an alert 306 may be published by the vehicle 31 to a topic of the message broker 202 subscribed to by the service delivery network 200. An alert 306 is a type of message 206 providing information from a sender to a recipient, without requesting the performance of a particular action. Responsive to the alert 306, the message broker 202 may publish an alert response 308 to the vehicle 31, as the service delivery network 200 is not required to provide a response to the alert 306. Exemplary alerts 306 may include alerts 306 published by vehicles 31 to provide status updates with respect to aspects of software updates being performed by the vehicles 31 (e.g., responsive to the software update command 302).

A publisher of the messages 206 may be responsible for providing messages 206 to the topics 204 that are consistent with the topic 204. The publisher may include, for example for commands 302, an OEM or other entity responsible for maintaining and/or updating vehicle software/firmware. In some cases, a vehicle 31 may be a publisher and may send vehicle alerts 306 to a topic 204 subscribed to by the service delivery network 200, may use alerts 306 notify the service delivery network 200 of vehicle 31 connectivity status to the network 61, or may respond to messages 206 from the service delivery network 200 with command responses 304. In other cases, a vehicle 31 may be a subscriber and may receive commands 302 or other information from a service delivery network 200 via the message broker 202.

The messages 206 may utilize a name/value pair model may allow for data elements of the messages 206 to be defined and referenced by vehicles 31 and the service delivery network 200 by name. Each message 206 may include certain base fields present in all messages 206. Moreover, each category of message 206 may include a certain minimum set of data elements present in all messages 206 of that category. For example, alerts 306 or other messages 206 from the vehicle 31 to the service delivery network 200 may include a first set of common information useful for recipients of messages 206 from vehicles, and commands 302 or other messages 206 from the service delivery network 200 to the vehicle 31 may include a second set of common information useful for recipients of messages 206 from the service delivery network 200.

Depending on the type of the message 206 (e.g., the type of command 302), the message 206 may further include additional fields relevant to that specific message type 206. To do so, the name/value pair model may allow for subsets of data to be defined (e.g., information to include in messages 206 from vehicles 31, information to be included in messages 206 from the service delivery network 200, information describing the status of the vehicle 31, etc.) which may then be included in message 206 definitions without requiring redundant redefinition for each type of message 206 requiring the common information. Further, since the fields of the message 206 may be referenced by the vehicles 31 and service delivery network 200 by name or identifier (rather than by raw byte offset into the message 206), the system may allow for the addition of data elements to the message 206 definitions (or to the common information definitions) without undesirably affecting deployed vehicles 31 that implement communication with the service delivery network 200 utilizing a previous version of the message 206 definitions.

With respect to the processing of the various categories of messages 206 published to the topics 204, the vehicle 31 may be configured to execute commands 302 that it receives from the service delivery network 200 in the order in which the commands 302 were received. To do so, the vehicle 31 may be configured to maintain a command queue of received commands 302, to allow the vehicle 31 to execute the received commands 302 from the queue in the a first-in-first-out (FIFO) manner. The vehicle 31 may also be configured to execute alerts 306 in the order they take place on vehicle 31 side. To do so, the vehicle 31 may be configured to maintain an alert queue so that it may execute the alerts 306 from the queue in a last-in-first-out (LIFO) manner. In the case of a conflict between a command 302 and an alert 306, the vehicle 31 may be configured to execute the messages 206 in the order they are received from the service delivery network 200 or took place on the vehicle 31 based on time stamps of the messages 206.

The topics 204 may be utilized to allow the messages 206 to be published to or from the appropriate vehicles 31 and in the proper category of message 206. To facilitate the publishing of messages 206 to appropriate topics 204, the topics 204 may be arranged into a topic tree 208. The topic tree 208 may be defined by the service delivery network 200 to provide a structure of the topics 204 and sub-topics 204 that are used in sending messages 206 between the vehicles 31 and the service delivery network 200.

The configurable module 210 may be one component of the vehicle 31 that may be configured according to the publish/subscribe model. The configurable module 210 may support a plurality of features that allow the configurable module 210 to operate in a variety of regions, vehicles, and model years. In some cases, the configurable module 210 may be one aspect of the VCS 1, while in other cases the configurable module 210 may be a separate component from the VCS 1. In yet further cases, a vehicle 31 may include multiple configurable modules 210, where each of the multiple configurable modules 210 may be configured as described herein. As one possibility, the vehicle TCU may be implemented as a configurable module 210.

Based on the vehicle 31 configuration (e.g., as built upon end-of-line (EOL) configuration at the vehicle manufacturing facility, as modified post build, etc.) and other vehicle factors (e.g., vehicle 31 owner, a geographic region associated with the vehicle 31, and a software version of a vehicle component of the vehicle 31), the service delivery network 200 may be configured to enable, disable, or configure features of the configurable module 210 by providing messages 206 or configuration files 212 from the service delivery network 200 to topics 204 to which the vehicle 31 is subscribed. A message 206 may be used, for example, to adjust a setting of the configurable module 210, such as to enable or disable a portion of functionality, or to configure a parameter of a portion of functionality. A configuration file 212 may include information to configure multiple portions of functionality of the configurable module 210. In some cases, a configuration file 212 may include information useful to allow the configurable module 210 to enable, disable, or configure all or substantially all of the functionality of the configurable module 210.

The vehicle data store 214 may be configured to maintain vehicle 31 feature associations regarding aspects of the configuration of the vehicles 31. As one possibility, the vehicle data store 214 may be configured to maintain information regarding which vehicles 31 are associated with what owners or customers. For example, the vehicle data store 214 may maintain an association of vehicle identifiers (e.g., VINs) of vehicles 31 that are owned by or otherwise part of a fleet of vehicles as being associated with that fleet. The vehicle data store 214 may further maintain fleet-specific settings associated with the fleet of vehicles 31. As another possibility, the vehicle data store 214 may maintain an association of vehicle identifiers (e.g., VINs) of vehicles 31 that are subscribed to various vehicle 31 features. For instance, the vehicle data store 214 may maintain an association of those vehicles 31 that are subscribed to a turn-by-turn directions service. As yet a further possibility, the vehicle data store 214 may be configured to maintain information regarding the current vehicle configuration information provided to the vehicles 31. This information may be used, for example, to determine whether various types of changes may requires updates to the configuration of a vehicle 31.

Thus, the configurable module 210 may be configured to have a set of features enabled, disabled, added, deleted, and/or configured based on the needs for the vehicle 31, allowing a single part number of configurable module 210 to be utilized across regions, vehicles 31, and model years. The configurable module 210 may additionally be updated based on changed needs for the vehicle 31. For instance, the service delivery network 200 may be configured to enable a feature when the vehicle 31 is subscribed to the feature, and disable the feature when the vehicle 31 is unsubscribed from the feature.

Figure 4:
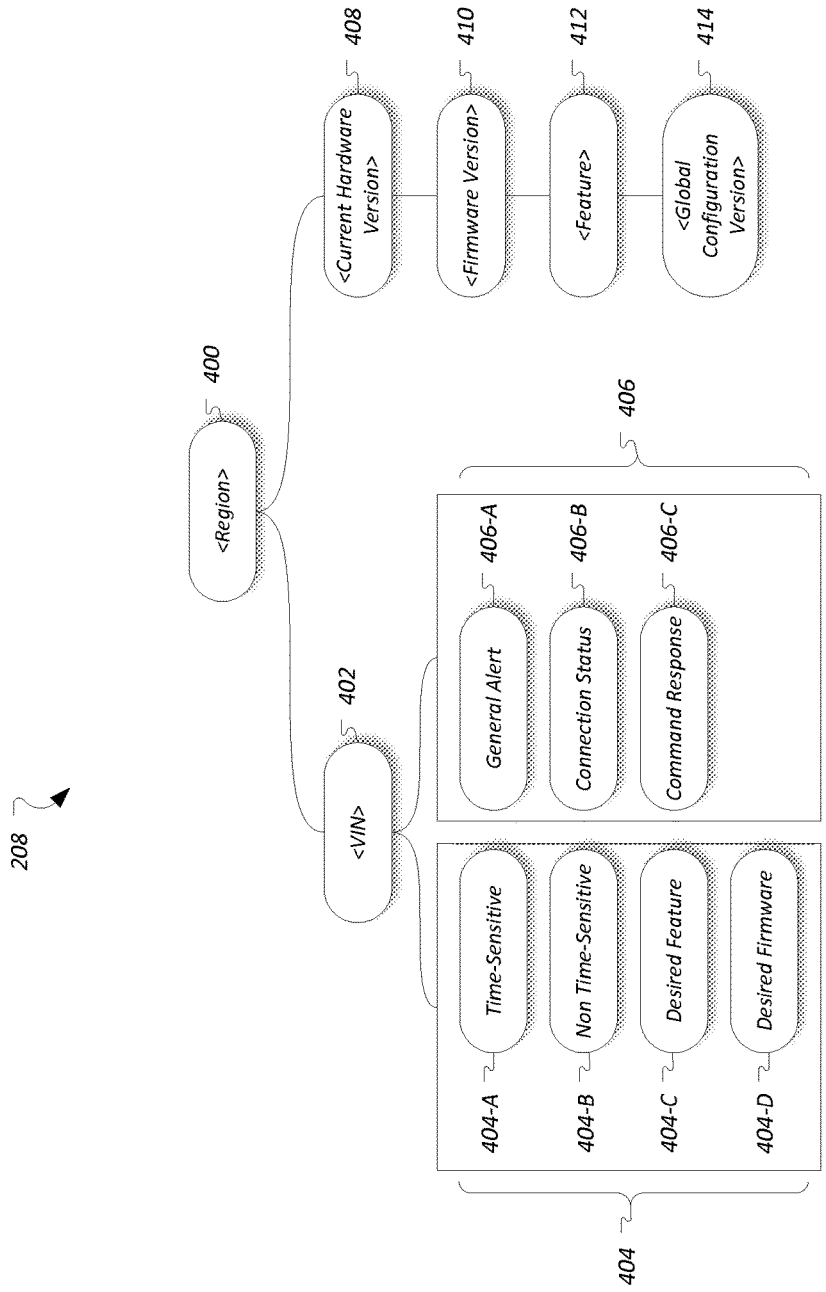
FIG. 4 illustrates an exemplary topic tree for use in vehicle-based computing system to service delivery network communication.

FIG. 4 illustrates an exemplary topic tree 208 for use in VCS 1/service delivery network 200 communication. The topic tree 208 may be used, for example, to allow the service delivery network 200 to define a topic 204 structure for performing vehicle 31 software and configurations updates. A VCS 1, such as a telematics unit of a vehicle 31, may subscribe to nodes of the topic tree 208 that correspond to the installed region, software/firmware version, features, configuration file version of the vehicle 31, etc. It should be noted that the particular layout of the exemplary topic tree 208 is for purpose of illustration only, and other layouts of topic tree 208 may be used. For example, other topic trees 208 may be used by the service delivery network 200 that have more, fewer or different levels of categorization.

Referring to the topic tree 208 of FIG. 4, a region node 400 of the topic tree 208 may indicate a region for which the sub-topic 204 nodes under the region node 400 may relate. In some cases, the region nodes 400 may represent different regional market areas in which vehicles 31 may be sold, such as North America, Europe, and Asia Pacific. In other examples the region nodes 400 may relate to other geographical areas, such as countries, states, postal codes, and telephone area codes, as some other examples. By segmenting the topic tree 208 by region, the service delivery network 200 may accordingly publish different information for vehicles 31 associated with different regions.

Under each region node 400, the topic tree 208 may include one or more vehicle-specific nodes 402, where each vehicle-specific node 402 relates to a vehicle 31 associated with the parent regional node 400. As one possibility, the service delivery network 200 may create vehicle-specific nodes 402 for vehicles 31 according to VIN or other unique identifier of vehicles 31 that register with the service delivery network 200 as belonging to the particular region. Sub-nodes to the vehicle-specific nodes 402 may be used to further organize topics 204 configured for communication to and from the individual vehicles 31.

For instance, under the vehicle-specific nodes 402, the topic tree 208 may further include one or more vehicle topic nodes 404 for communication to the specific vehicles 31. A vehicle 31 may subscribe to the vehicle topic node 404 that correspond to the VIN or other unique identifier of the vehicle 31, so that the vehicle 31 may be able to receive messages 206 in topics 204 that specifically relate to the vehicle 31 itself.

As one example, a vehicle 31 may subscribe to a time-sensitive update vehicle topic node 404-A for receiving messages 206 (such as time-sensitive commands 302 as discussed in more detail below) for the particular vehicle 31 that are of a time-sensitive nature. Due to their time-sensitive nature, messages 206 posted to the time-sensitive update vehicle topic node 404-A may time out and be removed from the topic 204 if they are not received by the vehicle 31 within an amount of time (e.g., an amount of time specified by the message 206, an amount of time common to all time-sensitive messages 206, etc.). As another example, a vehicle 31 may subscribe to a non-time-sensitive vehicle topic node 404-B for receiving messages 206 for the particular vehicle 31 that not of a time-sensitive nature (e.g., non-time-sensitive commands 302, also discussed in more detail below).

Updates, such as calendar updates, may be posted to the non-time-sensitive vehicle topic node 404-B, and may remain in the topic 204 until received by the subscribed vehicle 31. As a further example, a vehicle 31 may subscribe to a feature update vehicle topic node 404-C for receiving messages 206 in a topic 204 directed to particular vehicles 31 and relating to updates to the features 31 of the vehicle 31. In this content, a feature may refer to a grouping of configuration parameters applicable to the specified vehicle 31 included in the topic tree 208. A feature may, for example, represent settings to implement an available connected service (e.g., MY FORD MOBILE) or a customer-specific collection of settings (e.g., a suite of features requested to be enabled and/or disabled for use by a particular fleet purchaser). As yet a further example, a vehicle 31 may subscribe to a firmware update vehicle topic node 404-D for receiving messages 206 in a topic 204 directed to particular vehicles 31 and relating to updates to the firmware of the vehicle 31.

The vehicle-specific nodes 402 of the topic tree 208 may further include one or more vehicle topic nodes 406 for communication from the specific vehicles 31 (e.g., to the service delivery network 200). For example, a general alert topic node 406-A may be used by a vehicle 31 to publish messages 206 (e.g., alerts 306) such as indications of low fuel, erratic driving by the vehicle 31, or periodic current vehicle 31 GPS locations. As another example, a connection status topic node 406-B may be used by a vehicle 31 to publish messages 206 such as the connection status of the vehicle 31 (e.g., alerts 306 indicating whether the vehicle 31 was disconnected and then reconnected to the network 61). As yet a further example, a command response alert topic node 406-C may be used by a vehicle 31 to publish messages 206 such as alerts 306 indicating success or failure of command 302 requested by the service delivery network 200.

Moreover, under each region node 400 the topic tree 208 may include one or more hardware version topic nodes 408, where each hardware version topic node 408 relates to a installed vehicle 31 hardware version that may be shared by multiple vehicles 31 (e.g., a version of the VCS 1 hardware). These hardware version topic nodes 408 and sub-topic nodes may accordingly be used to reference the vehicles 31 according to hardware version, not according to individual vehicle 31.

Under each hardware version topic node 408, the topic tree 208 may include one or more firmware version nodes 410. Each firmware version node 410 may organize nodes of the topic tree 208 associated with a firmware version that may be installed on the parent tree relationship vehicle 31 hardware for a particular region.

The firmware version node 410 may further include feature nodes 412 organizing nodes of the topic tree 208 associated with a particular feature. As mentioned above, a feature may represent settings to implement an available connected service or a customer-specific collection of settings. Thus, a firmware version may support multiple different features, where different portions of functionality of the firmware are engaged or disengaged for the various features.

The feature nodes 412 may further include configuration version nodes 414, each representing a topic 204 related to a version of a configuration file for the associated feature, firmware version, hardware version, and region. The configuration files may include setting and other information related to the parent features that they configure (e.g., for the version of firmware installed on the version of hardware for the particular region). Because settings and other options may change from version to version, the configuration files may also include a version number of the firmware for which they are compatible.

A vehicle 31 may subscribe to topics 204 of the topic tree 208 that relate to the configuration of the vehicle 31. As one example, a vehicle may subscribe to a vehicle topic node 404 corresponding to the VIN of the vehicle 31, to receive any updates targeting the specific vehicle 31. As another example, a VCS 1 of a vehicle 31 may subscribe to a configuration version node 414 of the topic tree 208, to receive configuration or other updates corresponding to the installed region, hardware version, firmware version, feature, and global configuration version of the vehicle 31. The subscribed vehicle 31 may check or otherwise be informed of messages 206 published to the subscribed topics 204.

The service delivery network 200 may publish messages 206 into topics 204 of the topic tree 208 for which updates are to be performed. As one possibility, the service delivery network 200 may publish a command 302 into a vehicle topic node 404 to cause a particular vehicle 31 to be informed that an update should be performed for the vehicle 31. As another possibility, the service delivery network 200 may publish a command 302 into a configuration version node 414 to cause any subscribed vehicles 31 having a particular region, hardware version, firmware version, feature, and global configuration version to perform an update.

In some examples, an update may be indicated by a service delivery network 200 publishing a new configuration file 212 in the subscribed topic 204 as a command message 206, where the new configuration file 212 may be associated with an updated version of the software or firmware. A vehicle 31 receiving the configuration file 212 may identify the version of the configuration file 212, and may set a desired software or firmware version for the vehicle 31 to be that of the version of the configuration file 212. Thus, upon becoming aware of an update command message 206 in a subscribed topic node 204 of the topic tree 208, the vehicle 31 may identify to upgrade its software version to the version specified by the command message 206.

The vehicle 31 may further utilize the topic tree 208 to provide update messages 206 to the service delivery network 200 with respect to the status of the software update. For example, the vehicle 31 may publish alert messages 206 in an alert vehicle topic node 404 indicative of whether or not the software update was successful, and also to report the new installed version of the vehicle 31 software to the service delivery network 200. Accordingly, by using the topic tree 208, the service delivery network 200 may be able to request updates for individual vehicles 31 or for vehicles 31 having specific configurations.

For instance, a software module may have some vehicles 31 in the field at version 1. A bug or other issue may be identified that affects software version 1, or a new feature may wish to be added to the software. A new version of the software, version 2, may be created to correct the issue or add the new feature to the version 1 software. However, the size of the software update to version 2 may exceed the capabilities of the software module to handle as a single chunk.

Figure 5A:
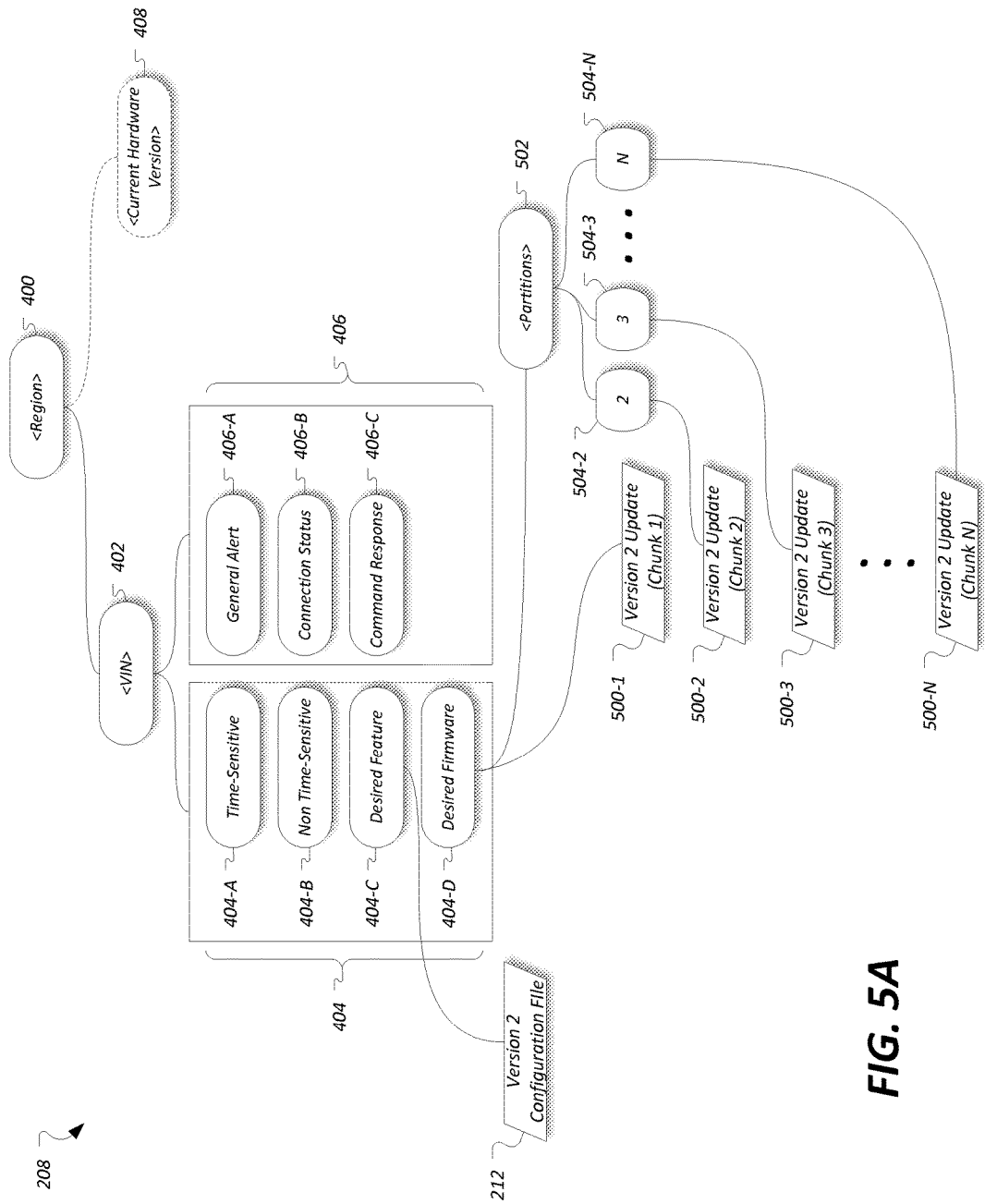
FIG. 5A illustrates an exemplary topic tree for updating a software component having multiple partitions.

FIG. 5A illustrates an exemplary topic tree 208 for performing a vehicle-specific updating of a software component having multiple partitions. The service delivery network 200 may perform a vehicle-specific software update under conditions, for example, where there is a desire to upgrade the global configuration file 212 or software for a vehicle 31 (or set of vehicles 31) in a manner that should not impact the larger group of software modules at the same feature and software version. In the event of a vehicle-specific firmware upgrade, the service delivery network 200 may be configured to publish a software update to the desired firmware node 404-D, and then publish the desired global configuration file 212 to the desired feature node 404-C.

If the software update is a single chunk 500, then the service delivery network 200 may publish the single chunk 500 under the desired firmware topic node 404-D. However, if the software update includes multiple chunks 500, then the service delivery network 200 may still publish the first chunk 500-1 of the partitioned software update under the desired firmware topic node 404-D, in the same location and manner that would be used for a single-chunk 500 vehicle-specific update. However, when there are multiple chunks 500 to the update, the first chunk 500-1 of the software update published to the desired firmware topic node 404-D may also specify a number of chunks 500 of the software update. As one example, the number of chunks 500 may be specified in a number-of-chunks header field of the first chunk 500-1 of the software update.

If there are additional chunks 500-2 through 500-N to the software update, the service delivery network 200 may be configured to also publish those additional chunks 500-2 through 500-N under the desired firmware node 404-D. As one possibility, each additional chunk 500-2 through 500-N may be published to its own separate topic node 204 of the topic tree 208. In one example, each additional chunk 500-2 through 500-N may be published under a sequenced (e.g., numbered) subtopic to a partitions topic subsection 204 under the desired firmware node 404-D as shown. As illustrated, the exemplary software update includes "N" chunks, each published under its own sequenced subtopic 504-2 through 504-N to a partitions subtopic 204 to the desired firmware node 404-D. In another example, each additional chunk 500-2 through 500-N may be published under a sequenced subtopic 504-2 through 504-N directly under the desired firmware node 404-D.

The service delivery network 200 may be further configured to publish an update command 302 to the desired feature node 404-C for a specific vehicle 31 to be updated. The update command 302 may include or reference a network location of a configuration file 212 associated with the updated version of the software (e.g., version 2 as illustrated), such that the vehicle 31 may set a desired software or firmware version for the vehicle 31 to be the updated version.

The vehicle 31 being targeted to receive the update may be subscribed to the desired feature node 404-C, as the desired feature node 404-C may be one of the topics 204 of the topic tree 208 that relate to the configuration of the vehicle 31. To begin the update, the VCS 1 of the vehicle 31 may receive the update command 302 published by the service delivery network 200 to the desired feature node 404-C.

Upon receipt of the update command 302, the VCS 1 may be configured to retrieve the desired configuration file 212 specified by or included in the update command 302, and may determine whether the desired version of the software is greater than the current version of the software. If so, the VCS 1 may be configured to subscribe to the desired firmware topic 404-D and check to see if any firmware update messages are available. As illustrated, the VCS 1 may identify that the first partition of the version 2 update is available in the desired firmware topic 404-D, and may download the first chunk 500-1.

The VCS 1 may determine, based on the downloaded first chunk 500-1 if the software update is partitioned or wholly contained in that single chunk 500-1. In an example, the VCS 1 may be configured to read header information of the chunk 500-1 to determine whether the chunk 500-1 includes number-of-chunks information. If no such information is included, the VCS 1 may conclude that the file 500-A is the entire update. If the information is included, and the number of chunks is one, then again the VCS 1 may conclude that the software update is wholly contained in the chunk 500-1. If, however, the information of the chunk 500-1 indicates that there are additional chunks 500-2 through 500-N to be downloaded, the VCS 1 may be configured to subscribe to additional sequenced topics 504-2 through 500-N of the topic tree 208 to retrieve the remaining chunks 500-2 through 500-N. As illustrated, the additional sequenced topics 504 are organized under an updates subtopic 502 to the desired firmware topic 404-D, but other arrangements are possible, such as placement of the updates subtopics 502 directly under the desired firmware topic 404-D. Regardless of organization, the VCS 1 may be further configured to download and install the additional chunks 500-2 through 500-N (e.g., from the respective topics 504-2 through 504-N).

Regardless of the number of chunks 500, upon a successful download, the VCS 1 may be configured to publish a firmware download command response 304 or alert 306 to the service delivery network 200 (e.g., in topic 406-C) indicating a successful download responsive to the update command 302. In the case of a failure of the download, the response 304 or alert 306 may be configured to provide, to the service delivery network 200, an indication of the chunk 500 number that failed.

Upon installation of the software update, the VCS 1 may be configured to install the desired configuration file 212 corresponding to the updated software version. For example, the desired configuration file 212 to be installed may be the global configuration file 212 specified by or included in the update command 302 initiating the update process. It should be noted that, if the software update and the configuration file 212 are mismatched versions, the upgrade will fail.

Once the VCS 1 has successfully installed the software update and the configuration file 212, the VCS 1 may be configured to provide, to the service delivery network 200, an update of its current software version and configuration file 212 status. In an example, the VCS 1 may publish both a firmware upgrade alert 306 and also a global configuration upgrade alert 306 to the general alert 406-A topic of the topic tree 208.

It should be noted that the VCS 1 does not generally maintain subscription to the vehicle-specific firmware version topics 404 and 504. Rather, these subscriptions are performed when the VCS 1 is in the process of updating firmware triggered by the command 302 published to the desired feature 404-C upgrade. Upon successful installation of the firmware the VCS 1 may be configured to unsubscribe from the vehicle-specific firmware version topics (e.g., 404-D as well as the subtopics 504).

Figure 5B:
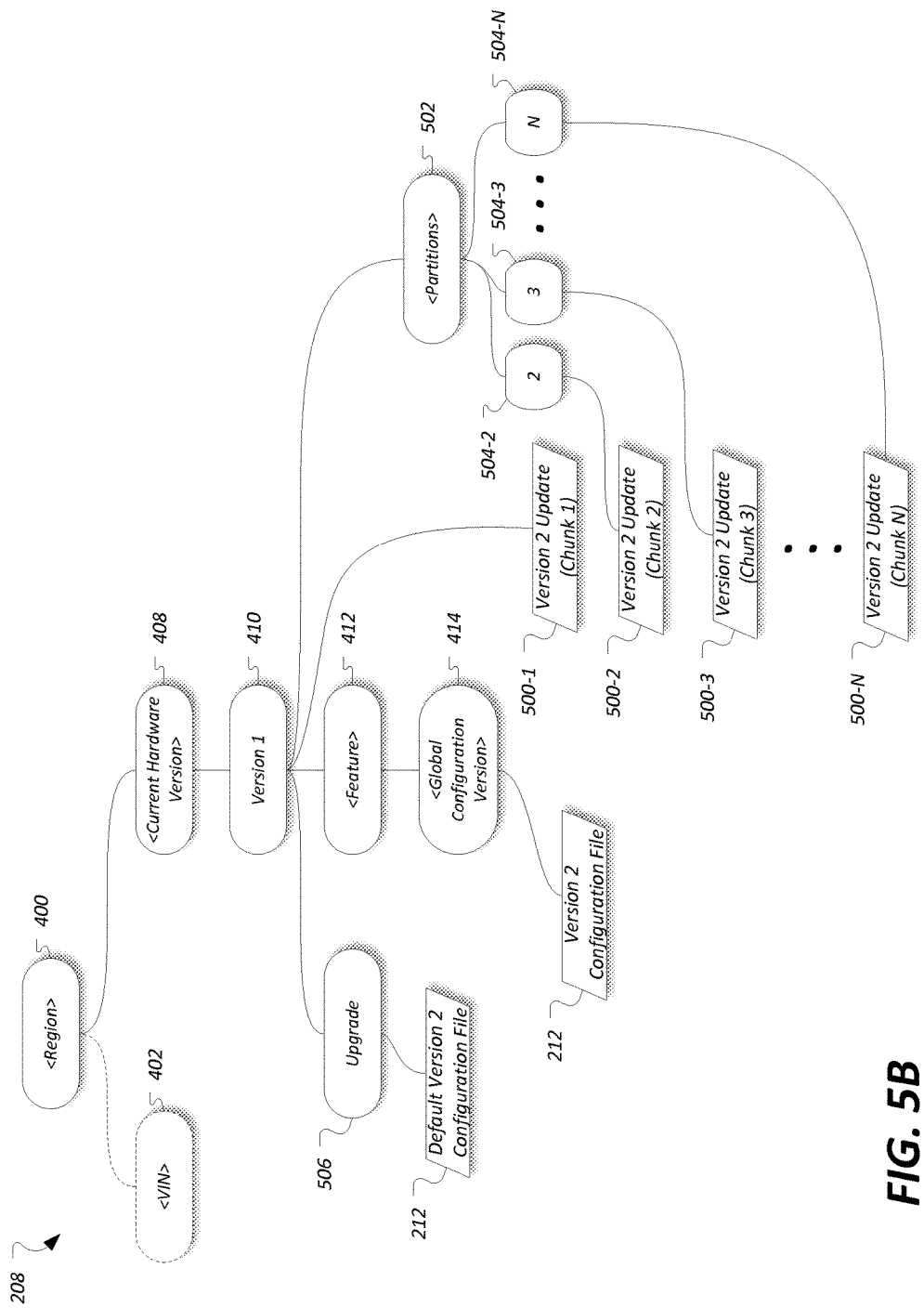
FIG. 5B illustrates an alternate exemplary topic tree for updating a software component having multiple partitions.

FIG. 5B illustrates an alternate exemplary topic tree 208 for updating a software component having multiple partitions. In the illustrated alternate example, the service delivery network 200 may publish a command 302 into a configuration version node 414 to cause any subscribed vehicles 31 having a particular region, hardware version, firmware version, feature, and global configuration version to perform an update. The service delivery network 200 may perform a version-specific update under conditions, for example, where there is a desire to upgrade all vehicles 31 at a particular version level of configuration file 212 or software for a vehicle 31 to an updated version or configuration. In the event of a version-specific firmware upgrade, the service delivery network 200 may be configured to publish the software update to the desired firmware node 410, and then publish the desired global configuration file 212 to the global configuration version node 414.

Apart from these differences in location and intended audience, the update procedure may flow similar to that discussed above with respect to FIG. 5A. For example, upon receiving the updated global configuration file 212 published to the global configuration version node 414, the VCS 1 may be configured to subscribe to the desired firmware version node 410 associated with the current version of the vehicles 31 software, in which the software update to the next software version would be placed. If available, the VCS 1 may be configured to download the first software update chunk 500-1. Upon successful download, the VCS 1 may be configured to publish a firmware download command response 304 to the service delivery network 200 indicating a successful download (e.g., to the topic 406-A). The VCS 1 may be further configured to open the software update chunk 500-1 and determine if the software update is partitioned or wholly contained in that single chunk 500-1. The VCS 1 may do so, for example, by reading the header of the software update chunk 500-1, and determining the number of chunks 500. If the number of chunks 500 is one or not specified, then the VCS 1 may determine that the software update is wholly contained in the chunk 500-1 that was downloaded. If not, the VCS 1 may be configured to subscribe to additional topics 504-2 through 504-N to retrieve the remaining chunks 500-2 through 500-N, respectively.

Upon the software update download, the VCS 1 may be configured to publish to the service delivery network 200 an alert 306 that the download was successful or failed. In case of a download failure, the alert 306 may include the chunk number of the download in which the failure had occurred.

Moreover, in the version-specific portion of the topic tree 208, each version may include an upgrade topic 506 that, in turn, contains a default upgrade global configuration file 212 for the associated version of the software. For example, for the version 1 illustrated in FIG. 5B, the upgrade topic 506 may include a default version 2 configuration file 212. As part of the update, the VCS 1 may be configured to subscribe to the topic 506, and download the default upgrade global configuration file 212.

Once the VCS 1 has successfully upgraded to the next iteration of software and upgrade configuration file 212, the VCS 1 may be configured to provide, to the service delivery network 200, an update of its current software version and configuration file 212 status. In an example, the VCS 1 may publish both a firmware upgrade alert 306 and also a global configuration upgrade alert 306 to the general alert 406-A topic of the topic tree 208.

It should be noted that in some cases, the desired configuration file 212 specifies a desired version that is multiple versions ahead of the current software version of the VCS 1. As an example, a vehicle 31 at version 1 may receive a desired configuration file 212 specifying that the desired software version is version 3. When this occurs, the vehicle 31 may subscribe to the firmware version node 410 topic 204 of the topic tree 208 corresponding to the region and installed firmware version of the vehicle 31 (i.e., version 1). The vehicle 31 subscribed to the firmware version node 410 for version 1 may receive the published notification of the incremental software update 400-A from version 1 to version 2, and may download and install the incremental update. This update may include one or more chunks 500 as discussed in detail above. Upon successful installation, the vehicle 31 may now be at version 2 of the software. As the vehicle is now at version 2, the vehicle 31 may unsubscribe from the configuration version node 414 of the topic tree 208 related to version 1 and the firmware version node 410 for version 1, and may subscribe to the configuration version node 414 of the topic tree 208 related to version 2. Identifying that the update is not yet to the desired version, the vehicle 31 may subscribe to the firmware version node 410 topic 204 of the topic tree 208 corresponding to the region and installed firmware version of the vehicle 31 (i.e., version 2). The vehicle 31 may accordingly receive the published notification of the incremental software update from version 2 to version 3, and may download and install another software update. This update may also include one or more chunks 500 as discussed in detail above. Upon successful installation, the vehicle 31 may now be at version 3 of the software. As the vehicle is now at version 3, the vehicle 31 may unsubscribe from the configuration version node 414 of the topic tree 208 related to version 2 and the firmware version node 410 for version 2, and may subscribe to the configuration version node 414 of the topic tree 208 related to version 3.

Once VCS 1 reaches its desired software version (e.g., the desired version specified by the updated global configuration file 212 published to the global configuration version node 414 that initiated the upgrade) and default upgrade configuration file 212 for that firmware (e.g., as published to the upgrade topic 506 corresponding to the last software version upgraded from), the VCS 1 may be configured to apply the updated global configuration file 212 published to the global configuration version node 414 (e.g., maintained by the VCS 1 throughout the software update). Accordingly, the software update to the desired software version may be completed.

Figure 6:
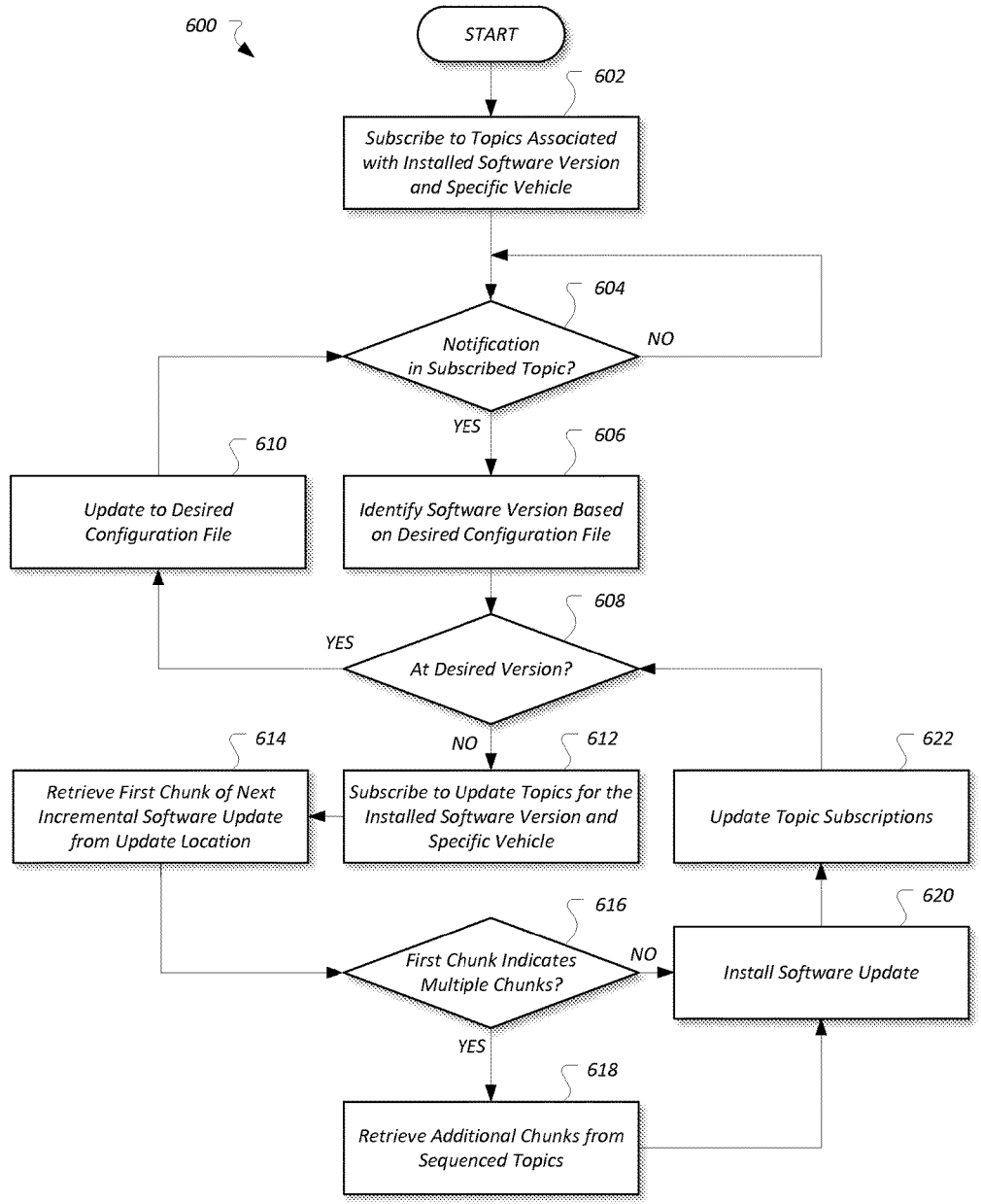
FIG. 6 illustrates an exemplary process for updating a software version of a component of the vehicle-based computing system having multiple partitions.

FIG. 6 illustrates an exemplary process 600 for updating a software version of a component of the VCS 1. The process 600 may be performed, for example, by a VCS 1 of a vehicle 31 in communication with a service delivery network 200 over a network 61.

At block 602, the VCS 1 subscribes to topics 204 of a topic tree 208 in which commands 302 to update the software version or configuration of one or more modules of the vehicle 31 are published. These modules may include, for example a configurable module 310 such as a vehicle 31 TCU. For example, the VCS 1 may subscribe to a desired feature node 404-C of the topic tree 208 into which vehicle-specific updates for a software component of a module of the vehicle 31 may be published by the service delivery network 200. As another example, the VCS 1 may subscribe to a configuration version node 414 representing a topic 204 of the topic tree 208 served by the service delivery network 200 and related to the installed version, features, and region of the component or module of the vehicle 31.

At decision block 604, the VCS 1 determines whether a notification message 206 is received in one of the subscribed topics 204. As an example, the service delivery network 200 may publish a notification message 206 in the desired feature node 404-C to target an update to the vehicle 31. As another example, the service delivery network 200 may publish a notification message 206 in the configuration version node 414 to target vehicles 31 having a particular configuration. The vehicle 31 may be notified of or may otherwise receive the notification message 206 due to its subscription to the topics 204 of the topic tree 208. If a notification message 206 is received, control passes to block 606. Otherwise, control remains at decision block 604.

At block 606, the VCS 1 identifies a desired software version for the software component based on the notification message 206. For example, the notification message 206 may be, may include, or may reference a network location of a desired configuration file 212, where the desired configuration file 212 may be associated with an updated version of the software or firmware. For instance, the desired configuration file 212 may include a version number of the firmware or other version indication for which the file is compatible. A vehicle 31 receiving the desired configuration file 212 may identify the version of the configuration file 212, and may set a desired software version for the vehicle 31 to be that of the version of the desired configuration file 212.

At decision block 608, the VCS 1 determines whether the desired software version and the installed software version differ. For example, the VCS 1 may determine whether the version of the configuration file 212 is greater than the installed version of the software. If so, control passes to block 612 to perform a software update. If not, then a software update is not required and control passes to block 610 to apply the received configuration file 212. If the version of the configuration file 212 is less than that of the installed version, then the VCS 1 may discard the configuration file 212, optionally provide an error alert 306 back to the service delivery network 200, and may either pass control to decision block 604 or terminate the process 600.

At block 612, as the software version is the desired software version, the VCS 1 applies the desired configuration file 212. Accordingly, any configuration changes made in the configuration file 212 may be applied to the settings of the vehicle 31. After block 612, control returns to decision block 604.

At block 612, the VCS 1 subscribed to update topics for the installed software version and specific vehicle 31. For example, the vehicle 31 may subscribe to the desired firmware node 404-D topic 204 of the topic tree 208 corresponding to the vehicle identifier of the vehicle 31. As another example, the vehicle 31 may subscribe to the firmware version node 410 topic 204 of the topic tree 208 corresponding to the installed firmware version of the vehicle 31. As yet a further example, the vehicle 31 may subscribe to the upgrade topic 506 that contains a default upgrade global configuration file 212 for the next version of the software to be downloaded. The service delivery network 200 may have published a software update to the desired firmware node 404-D or to the firmware version node 410, and the subscribed vehicle 31 may download the software update.

At block 614, the VCS 1 retrieves a first chunk 500-1 of the next incremental software update. In some cases, the vehicle 31 may first check the desired firmware node 404-D for updates, and if no update is located in that topic 204, then check the firmware version node 410 topic 204. This ordering may be done, for example, to allow for vehicle-specific update topics 204 to have priority over firmware version update topics 204. When an update is found, the vehicle 31 may download the first chunk 500-A of the update as published to the topic 204 in which it was located. The VCS 1 may be further configured to download the default configuration file 212 corresponding to the version of the first chunk 500-A according to the subscription to the upgrade topic 506.

At decision block 616, the VCS 1 determines whether the first chunk 500-1 indicates that there are multiple chunks 500 of the software update. For example, when there are multiple chunks 500 to the update, the first chunk 500-1 of the software update may specify a number of chunks 500 of the software update. As one example, the number of chunks 500 may be specified in a number-of-chunks header field of the first chunk 500-1 of the software update. If the first chunk 500-1 indicates there are multiple chunks 500-2 through 500-N, control passes to block 618.

At block 618, the VCS 1 retrieves the additional chunks 500-2 through 500-N of the software update. For example, if there are additional chunks 500-2 through 500-N to the software update, the vehicle 31 may be configured to subscribe to topics 204 of the topic tree 208 into which those additional chunks 500-2 through 500-N have been published by the service delivery network 200, and retrieve the additional chunks 500-2 through 500-N published to those topics 204. As one possibility, each additional chunk 500-2 through 500-N may be published to its own separate topic node 204 of the topic tree 208. In one example, each additional chunk 500-2 through 500-N may be published under a sequenced (e.g., numbered) subtopic to a partitions topic subsection 204 under the desired firmware node 404-D or firmware version node 410. As illustrated in FIGS. 5A and 5B, the exemplary software update includes "N" chunks, each published under its own sequenced subtopic 504-2 through 504-N to a partitions subtopic 204. In another example, each additional chunk 500-2 through 500-N may be published under a sequenced subtopic 504-2 through 504-N directly under the desired firmware node 404-D or firmware version node 410.

At block 620, the VCS 1 installs the software update. For example, the VCS 1 may execute or otherwise apply the firmware update to the installed firmware version to update the firmware version. The VCS 1 may be further configured to install the default configuration file 212 for the installed version. In some cases, the VCS 1 may be further configured to provide publish a message 206 to a command response alert topic node 406-C of the vehicle 31 to alert the service delivery network 200 of success or failure of the software update. Upon receiving a message 206 indicating success of the software update, the service delivery network 200 may update its records of the installed configuration status of the vehicle 31. As another possibility, if the software update fails, the VCS 1 may publish a failure message 206 to the command response alert topic node 406-C, and the process 600 may end, or possibly pass control to block 614 to retry the download and installation.

At block 622, the VCS 1 updates the topic 204 subscriptions of the vehicle 31. For example, the VCS 1 may unsubscribe the vehicle 31 from the configuration version node 414 of the topic tree 208 and the firmware version node 410 for the old version, and to subscribe to the configuration version node 414 of the topic tree 208 related to the new installed version of the firmware. As another example, the VCS 1 may unsubscribe the vehicle 31 from any sequenced subtopics 504-2 through 504-N under the desired firmware node 404-D or firmware version node 410. As yet a further example, the VCS 1 may unsubscribe the vehicle 31 may from the upgrade topic 506 that contains the default upgrade global configuration file 212. After block 622, control passes to decision block 608.

Thus, a service delivery network 200 may utilize a topic tree 208 to selectively provide updates to vehicles 31 according to installed software version, such as firmware version of a module of the vehicle 31, or a software version of an application installed on the VCS 1, without affecting the vehicle 31 installations of software versions on vehicles 31 of different versions. Moreover, these updates may be provided incrementally and automatically over-the-air to the vehicles 31, without incurring manufacturer or dealer technician costs. Moreover, to address cases where the size of a software update exceeds the amount of memory available in a download area of the recipient module or device, the software update may be published by the service delivery network 200 as multiple chunks 500, where the number of chunks may be identified by the recipient vehicle 31, and the multiple chunks 500 may be downloaded and installed. Accordingly, by utilizing a multiple chunk update mechanism, software updates of arbitrary size may be handled by a receiving module having only a fixed maximum amount of resources to receive and process software updates.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
   a vehicle controller including a hardware processor programmed to
   read, from a first subsection of a software update file retrieved from a topic of a topic tree for receiving vehicle updates, a number of subsections of the file,
   retrieve additional subsections of the file from a sequence of subtopics of the topic, each subtopic associated with a respective remaining one of the number of subsections, and
   update the software utilizing the retrieved subsections.

2. The system of claim 1, wherein the processor is further programmed to read the number of subsections according to a number-of-subsections field included in header information of the retrieved first software update subsection.

3. The system of claim 1, wherein the processor is further programmed to subscribe to the topic for receiving vehicle updates upon receiving an update notification in one of: (i) a first notification topic for receiving notification of updates associated with a software version installed to the vehicle or (ii) a second notification topic for receiving notifications of updates associated with a unique identifier of the vehicle.

4. The system of claim 3, wherein the update notification specifies a notification configuration file, and the processor is further programmed to determine a desired software version according to a version level of the software with which the configuration file indicates it is compatible.

5. The system of claim 4, wherein the processor is further programmed to:
   install a default configuration file for a version of the software utilizing the retrieved subsections, and upon performing the update of the software utilizing the retrieved subsections, install the notification configuration file in place of the default configuration file.

6. The system of claim 1, wherein the software update is configured to update a telematics unit of the vehicle.

7. The system of claim 1, wherein the processor is further programmed to unsubscribe from the topic and unsubscribe from each of the sequence of subtopics to the topic upon performing the update of the software utilizing the retrieved subsections.

8. A method comprising:
reading by a computing system of a vehicle, from a first software update subsection retrieved from a topic of a topic tree for receiving vehicle updates, a number of subsections of the update;
retrieving additional subsections of the update from a sequence of subtopics of the topic, each subtopic associated with a respective remaining one of the number of subsections; and
updating the software utilizing the retrieved subsections.

9. The method of claim 8, further comprising reading the number of subsections according to a number-of-subsections field included in header information of the retrieved first software update subsection.

10. The method of claim 8, further comprising subscribing to the topic for receiving vehicle updates upon receiving an update notification in one of: (i) a first notification topic for receiving notification of updates associated with a software version installed to the vehicle or (ii) a second notification topic for receiving notifications of updates associated with a unique identifier of the vehicle.

11. The method of claim 10, wherein the update notification specifies a notification configuration file, and further comprising determining a desired software version according to a version level of the software with which the configuration file indicates it is compatible.

12. The method of claim 11, further comprising:
installing a default configuration file for a version of the software utilizing the retrieved subsections, and
upon performing the update of the software utilizing the retrieved subsections, installing the notification configuration file in place of the default configuration file.

13. The method of claim 8, further comprising applying the software update to a telematics unit of the vehicle.

14. The method of claim 8, further comprising unsubscribing from the topic and unsubscribing from each of the sequence of subtopics of the topic upon performing the update of the software utilizing the retrieved subsections.

15. A non-transitory computer-readable medium including instructions that when executed by a computing system of a vehicle cause the vehicle to:
read, from a first software update subsection retrieved from a topic of a topic tree for receiving vehicle updates, a number of subsections of the update;
retrieve additional subsections of the update from a sequence of subtopics of the topic, each subtopic associated with a respective remaining one of the number of subsections; and
update the software utilizing the retrieved subsections.

16. The computer-readable medium of claim 15, further including instructions configured to cause the vehicle to read the number of subsections according to a number-of-subsections field included in header information of the retrieved first software update subsection.

17. The computer-readable medium of claim 15, further including instructions configured to cause the vehicle to subscribe to the topic for receiving vehicle updates upon receiving an update notification in one of: (i) a first notification topic for receiving notification of updates associated with a software version installed to the vehicle or (ii) a second notification topic for receiving notifications of updates associated with a unique identifier of the vehicle.

18. The computer-readable medium of claim 17, wherein the update notification specifies a notification configuration file, and further including instructions configured to cause the vehicle to determine a desired software version according to a version level of the software with which the configuration file indicates it is compatible.

19. The computer-readable medium of claim 18, further including instructions configured to cause the vehicle to:
install a default configuration file for a version of the software utilizing the retrieved subsections, and
upon performing the update of the software utilizing the retrieved subsections, install the notification configuration file in place of the default configuration file.

20. The computer-readable medium of claim 15, further including instructions configured to cause the vehicle to unsubscribe from the topic and unsubscribe from each of the sequence of subtopics of the topic upon performing the update of the software utilizing the retrieved subsections.

* * * * *